(12) United States Patent
Suomela et al.

(10) Patent No.: US 9,940,827 B2
(45) Date of Patent: Apr. 10, 2018

(54) CONTROLLING OPERATION OF A DEVICE

(71) Applicant: Provenance Asset Group LLC, Essex, CT (US)

(72) Inventors: Riku Oskari Suomela, Espoo (FI); Kanji Kerai, London (GB)

(73) Assignee: Provenance Asset Group LLC, Essex, CT (US)

( * ) Notice: Subject to any disclaimer, the term of this patent is extended or adjusted under 35 U.S.C. 154(b) by 0 days.

(21) Appl. No.: 14/785,376

(22) PCT Filed: Apr. 30, 2013

(86) PCT No.: PCT/IB2013/053413
§ 371 (c)(1),
(2) Date: Oct. 19, 2015

(87) PCT Pub. No.: WO2014/177909
PCT Pub. Date: Nov. 6, 2014

(65) Prior Publication Data
US 2016/0071409 A1    Mar. 10, 2016

(51) Int. Cl.
*G08C 17/02*   (2006.01)
*G01S 3/14*    (2006.01)
(Continued)

(52) U.S. Cl.
CPC ............... *G08C 17/02* (2013.01); *G01S 3/14* (2013.01); *G06F 3/012* (2013.01); *H04M 1/7253* (2013.01); *H04R 1/1041* (2013.01); *H04W 4/008* (2013.01); *H04W 4/026* (2013.01); *G08C 2201/71* (2013.01); *G08C 2201/91* (2013.01); *H04B 7/04* (2013.01); *H04M 1/6066* (2013.01);
(Continued)

(58) Field of Classification Search
CPC .... G08C 17/00; G08C 2201/91; G08C 17/02; H04W 4/026; G06F 3/012; G06F 3/0346; G01S 3/14
See application file for complete search history.

(56) References Cited

U.S. PATENT DOCUMENTS 5,554,980 A   9/1996 Hashimoto et al.
6,539,229 B1  3/2003 Ali
(Continued)

FOREIGN PATENT DOCUMENTS

EP   1901086   3/2008
EP   2428869   3/2012
(Continued)

OTHER PUBLICATIONS

International Search Report and Written Opinion received for corresponding Patent Cooperation Treaty Application No. PCT/IB2013/053413, dated Dec. 3, 2013, 13 pages.
(Continued)

*Primary Examiner* — Thomas Alunkal
(74) *Attorney, Agent, or Firm* — Dinsmore & Shohl LLP

(57) ABSTRACT

A method comprises determining, based on at least one radio frequency packet passed wirelessly between first and second devices using an array of plural antennas provided in one of the first and second devices, an orientation of the second device with respect to the first device and, if the orientation satisfies a predetermined criterion, controlling operation of the first device.

22 Claims, 10 Drawing Sheets

(51) Int. Cl.
  *H04M 1/725* (2006.01)
  *G06F 3/01* (2006.01)
  *H04R 1/10* (2006.01)
  *H04W 4/02* (2018.01)
  *H04W 4/00* (2018.01)
  *H04R 5/033* (2006.01)
  *H04M 1/60* (2006.01)
  *H04B 7/04* (2017.01)

(52) U.S. Cl.
  CPC ......... *H04M 1/72558* (2013.01); *H04R 5/033* (2013.01); *H04R 2420/07* (2013.01)

(56) References Cited

U.S. PATENT DOCUMENTS

| | | | |
|---|---|---|---|
| 6,865,395 | B2 | 3/2005 | Riley |
| 7,053,829 | B2 | 5/2006 | Krause et al. |
| 7,729,707 | B2 | 6/2010 | Aljadeff et al. |
| 8,462,745 | B2 | 6/2013 | Alizadeh-Shabdiz |
| 9,341,702 | B2 | 5/2016 | Reimann |
| 9,431,702 | B2 | 5/2016 | Reimann |
| 9,582,990 | B2 * | 2/2017 | Peng ................. G08C 17/02 |
| 2002/0009972 | A1 * | 1/2002 | Amento ................. G06F 3/017 455/66.1 |
| 2004/0203539 | A1 | 10/2004 | Benes et al. |
| 2005/0078087 | A1 * | 4/2005 | Gates ................. G06F 3/03543 345/163 |
| 2006/0052115 | A1 | 3/2006 | Khushu |
| 2006/0170591 | A1 | 8/2006 | Houri |
| 2007/0236381 | A1 * | 10/2007 | Ouchi ................. G08C 17/00 341/176 |
| 2007/0252721 | A1 * | 11/2007 | Geurts ................. G06F 3/0325 340/4.31 |
| 2009/0005975 | A1 | 1/2009 | Forstall |
| 2009/0043504 | A1 | 2/2009 | Bandyopadhyay |
| 2009/0153289 | A1 * | 6/2009 | Hope ................. G06F 3/04883 340/5.1 |
| 2009/0239591 | A1 * | 9/2009 | Alameh ................. H04M 1/05 455/574 |
| 2009/0295648 | A1 * | 12/2009 | Dorsey ................. H01Q 1/2266 343/702 |
| 2010/0323723 | A1 | 12/2010 | Gerstenberger et al. |
| 2011/0172916 | A1 | 7/2011 | Pakzad et al. |
| 2012/0057081 | A1 | 3/2012 | Petersson et al. |
| 2012/0098802 | A1 * | 4/2012 | Woon Feather ......... G01S 3/14 345/204 |
| 2013/0029685 | A1 | 1/2013 | Moshfeghi |
| 2013/0222271 | A1 * | 8/2013 | Alberth ................. G06F 1/163 345/173 |
| 2014/0171107 | A1 | 6/2014 | Kao et al. |

FOREIGN PATENT DOCUMENTS

| | | |
|---|---|---|
| GB | 2415486 | 12/2005 |
| WO | 2010052519 | 5/2010 |
| WO | 2012120335 | 9/2012 |

OTHER PUBLICATIONS

Extended European Search Report dated Dec. 2, 2016 for European Patent Application No. 13883456.9, 9 pages.

\* cited by examiner

CONTROLLING OPERATION OF A DEVICE

RELATED APPLICATION

This application was originally filed as PCT Application No. PCT/IB2013/053413 filed Apr. 30, 2013.

FIELD

This specification relates generally to controlling operation of a device. More specifically, the invention relates to controlling operation of the device on the basis of at least one radio frequency packet passed between the device and another device.

BACKGROUND

The average U.S. household has five connected electronic devices, while six percent have fifteen or more (http://go.bloomberg.com/tech-blog/2012-08-29-average-household-has-5-connected-devices-while-some-have-15-plus/). The average household in North America and Western Europe will have more than seven connected devices by the end of 2013 (CCS insights). Various systems are known for remotely controlling electronic devices. These include the transmission of infra-red or radio frequency signals, voice, or other audio, control and even motion detection.

SUMMARY

In a first aspect, this specification describes a method comprising determining, based on at least one radio frequency packet passed wirelessly between first and second devices using an array of plural antennas forming part of one of the first and second devices, an orientation of the second device with respect to the first device. The method further comprises, if the orientation satisfies a predetermined criterion, controlling operation of the first device.

Controlling the operation of the first device may be performed in response to detection of an event in respect of the second device. The event may comprise a determination that the orientation has satisfied the predetermined criterion for longer than a threshold duration. Alternatively, the event may comprise recognition, based on at least one radio frequency packet passed wirelessly between the first and second devices, of a performance of a gesture by the user in respect of the second device. The performance of the gesture may be recognised based on detected variations in the orientation of the second device with respect to the first device.

Controlling operation of the first device may comprise causing the first device to initiate or terminate provision of audio data. The second device may be affixable to, or may be part of, an audio headset and the provision of the audio data may be to the audio headset.

The method may further comprise, prior to determining the orientation of the second device, automatically setting the first device into a mode for wirelessly receiving radio frequency packets. The automatic setting of the first device into the mode for wirelessly receiving positioning packets may be triggered by receipt of a communication by the first device from a third device.

The orientation of the second device with respect to the first device may be determined in part by sequentially activating each of the plural antennas of the array.

The second device may be configured to be affixed to, or may be part of, a user-wearable carrier. The second device may be part of an audio headset.

In a second aspect, this specification describes apparatus comprising a plurality of radio frequency antennas, and at least one processor and at least one memory, the at least one memory including computer-readable code which, when executed by the at least one processor, causes the apparatus: to transmit, via the radio frequency antennas, at least one radio frequency packet for allowing determination by a remote device of the orientation of the apparatus relative to the remote device, wherein the apparatus is configured to be worn by a user or wherein the apparatus is configured to be affixed to a user-wearable carrier. The apparatus of the second aspect may be used as the second device of the first aspect.

The computer-readable code, when executed, may cause the apparatus to sequentially activate each of the plural antennas to transmit sequential portions of the at least one radio frequency packet. The apparatus or the user-wearable carrier may be an audio headset.

In a third aspect, this specification describes apparatus comprising: at least one processor and at least one memory, the at least one memory including computer-readable code which, when executed by the at least one processor, causes the apparatus: to determine, based on at least one radio frequency packet passed wirelessly between the apparatus and a remote device using an array of plural antennas forming part of one of the apparatus and the remote device, an orientation of the remote device with respect to the apparatus; and, if the orientation satisfies a predetermined criterion, to perform an operation. The apparatus of the third aspect may be used as the first device of the first aspect.

The computer-readable code, when executed by the at least one processor, may cause the apparatus to perform the operation of the first device in response to detection of an event in respect of the remote device. The event may comprise a determination that the orientation has satisfied the predetermined criterion for longer than a threshold duration. Alternatively, the event may comprise recognition, based on at least one radio frequency packet passed wirelessly between the apparatus and the remote device, of a performance of a gesture by the user in respect of the remote device. The performance of the gesture may be recognised based on detected variations in the orientation of the remote device with respect to the apparatus.

The performed operation may comprise initiation or interruption of a provision of audio data. The remote device may be configured to be affixed to, or may be part of, an audio headset and the provision of the audio data may be to the audio headset.

The computer-readable code, when executed by the at least one processor, may cause the apparatus, prior to determining the orientation of the remote device, to automatically set the apparatus into a mode for wirelessly receiving radio frequency packets. The computer-readable code, when executed by the at least one processor, may cause the apparatus to trigger the automatic setting into the mode for wirelessly receiving positioning packets in response to receipt of a communication by apparatus from a remote device.

In a fourth aspect, this specification describes a system comprising, the apparatus of the third aspect and the remote device. The remote device may comprise the array of plural antennas configured to transmit or receive the at least one radio frequency packet. The remote device may comprise at least one processor and at least one memory, the at least one memory including computer-readable code which, when executed by the at least one processor, causes the remote device to sequentially activate each of the plural antennas to transmit or receive sequential portions of the at least one positioning packet.

In a fifth aspect, this specification describes computer-readable code which, when executed by computing apparatus, causes the computing apparatus to perform a method according to the first aspect.

In a sixth aspect, this specification describes at least one non-transitory computer-readable memory medium having computer-readable code stored thereon, the computer-readable code being configured to cause computing apparatus to determine, based on at least one radio frequency packet passed wirelessly between first and second devices using an array of plural antennas forming part of one of the first and second devices, an orientation of the second device with respect to the first device, and, if the orientation satisfies a predetermined criterion, to control operation of the first device.

The computer readable code stored on the at least one non-transitory computer-readable memory medium may be further configured to cause the computing apparatus to perform a method according to the first aspect.

In a seventh aspect, this specification describes apparatus comprising means for determining, based on at least one radio frequency packet passed wirelessly between first and second devices using an array of plural antennas forming part of one of the first and second devices, an orientation of the second device with respect to the first device, and means for controlling operation of the first device if the orientation satisfies a predetermined criterion.

The apparatus may further comprise means for controlling the operation of the first device in response to detection of an event in respect of the second device. The event may comprise a determination that the orientation has satisfied the predetermined criterion for longer than a threshold duration. Alternatively, the apparatus may comprise means for recognising, based on at least one radio frequency packet passed wirelessly between the first and second devices, a performance of a gesture by the user in respect of the second device, and thereby detecting occurrence of the event. The means for recognising the performance of the gesture may be configured to recognise the gesture based on detected variations in the orientation of the second device with respect to the first device.

The apparatus may further comprise means for controlling operation of the first device to initiate or interrupt provision of audio data. The second device may be affixable to, or may be part of, an audio headset, and the apparatus may comprise means for providing the audio data to the audio headset.

The apparatus may further comprise means for automatically setting the first device into a mode for wirelessly receiving radio frequency packets, prior to determining the orientation of the second device. The apparatus may further comprise means for triggering the automatic setting of the first device into the mode for wirelessly receiving positioning packets in response to receipt of a communication by the first device from a third device.

BRIEF DESCRIPTION OF THE DRAWINGS

For a more complete understanding of example embodiments of the present invention, reference is now made to the following description taken in connection with the accompanying drawings in which.

DETAILED DESCRIPTION OF EXAMPLES OF EMBODIMENTS

Figure 1A:
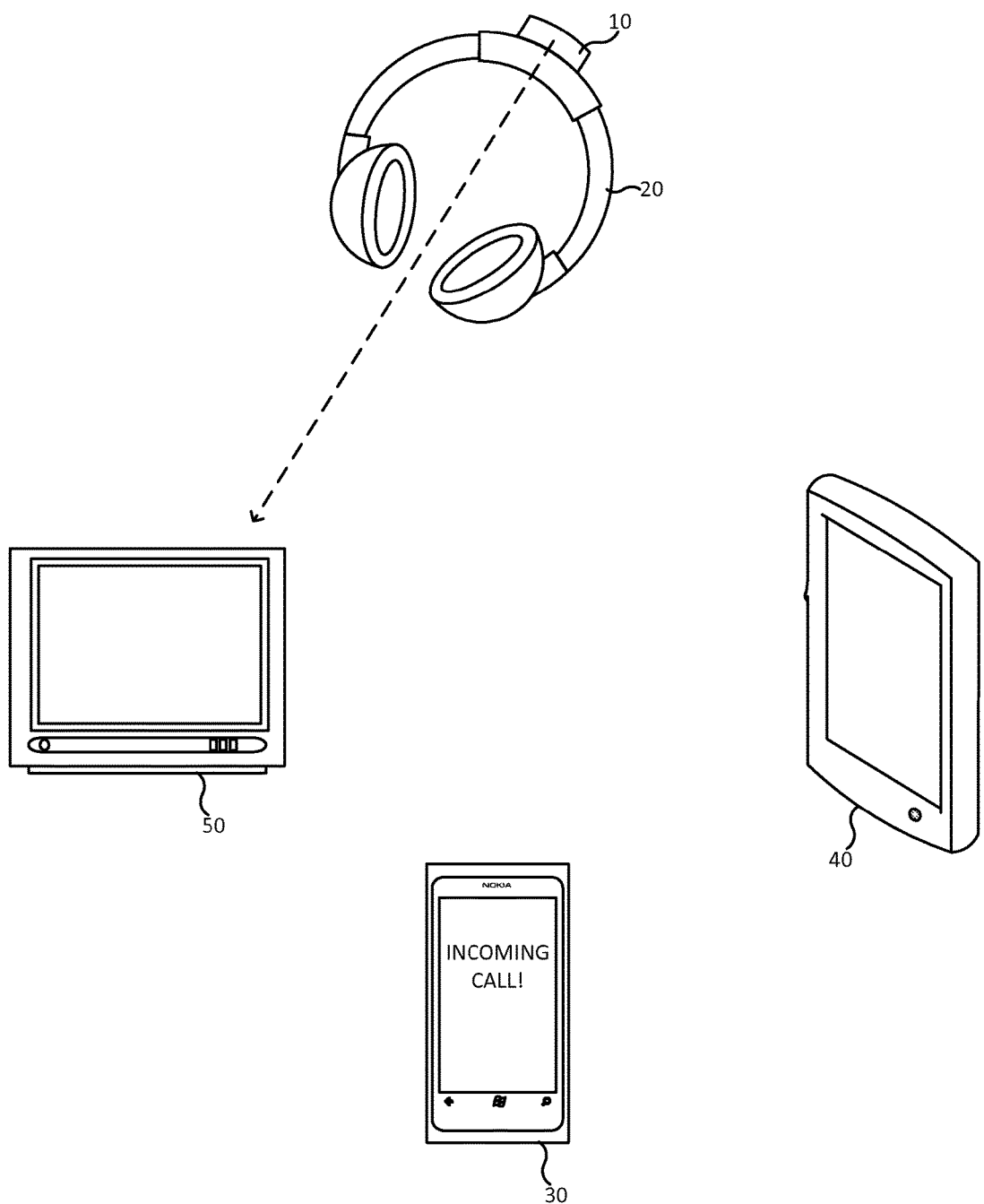
FIGS. 1A to 1C illustrate schematically examples of operations in accordance with the invention.

In the description and drawings, like reference numerals refer to like elements throughout.

Figure 1B:
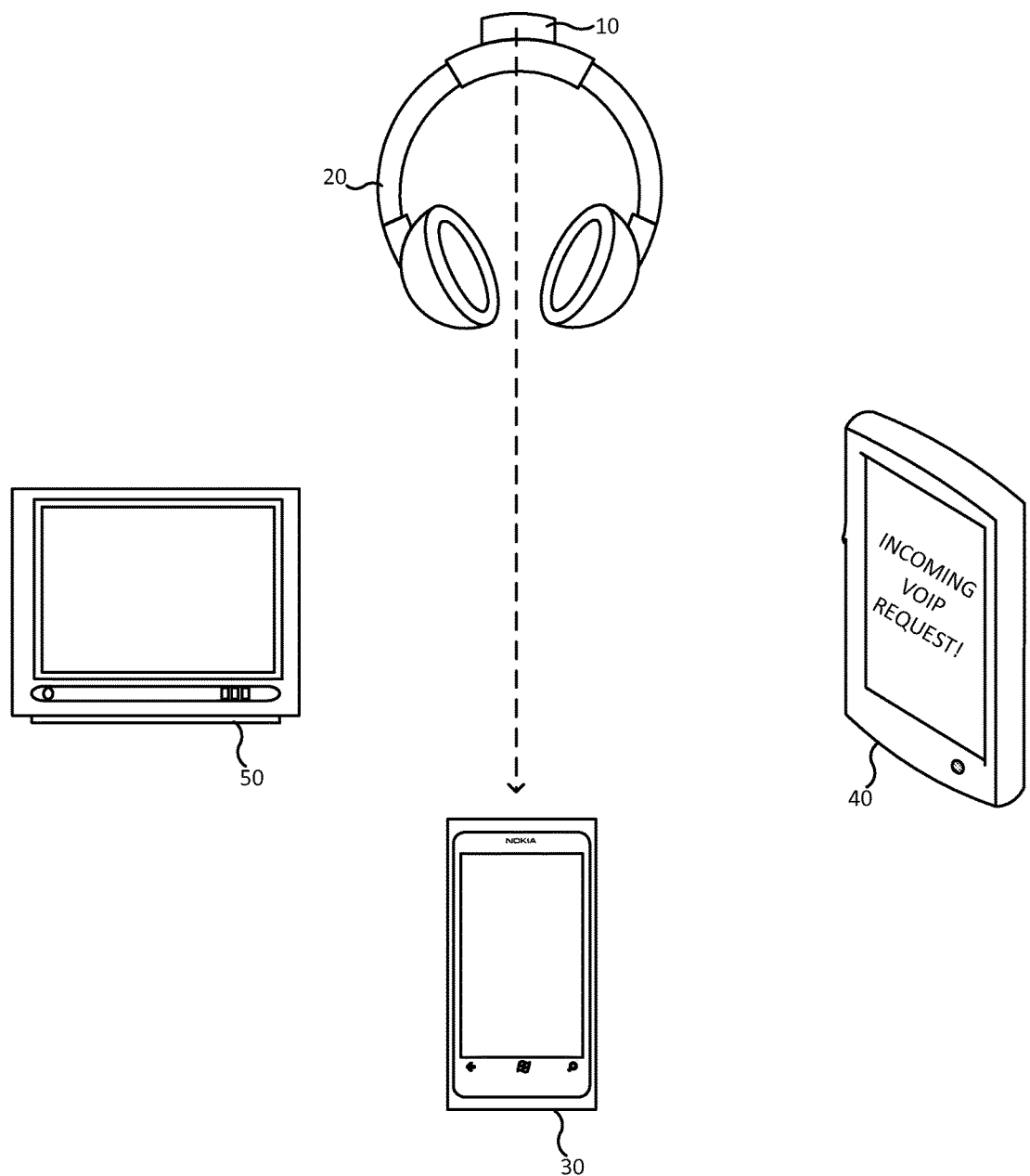
Figure 1C:
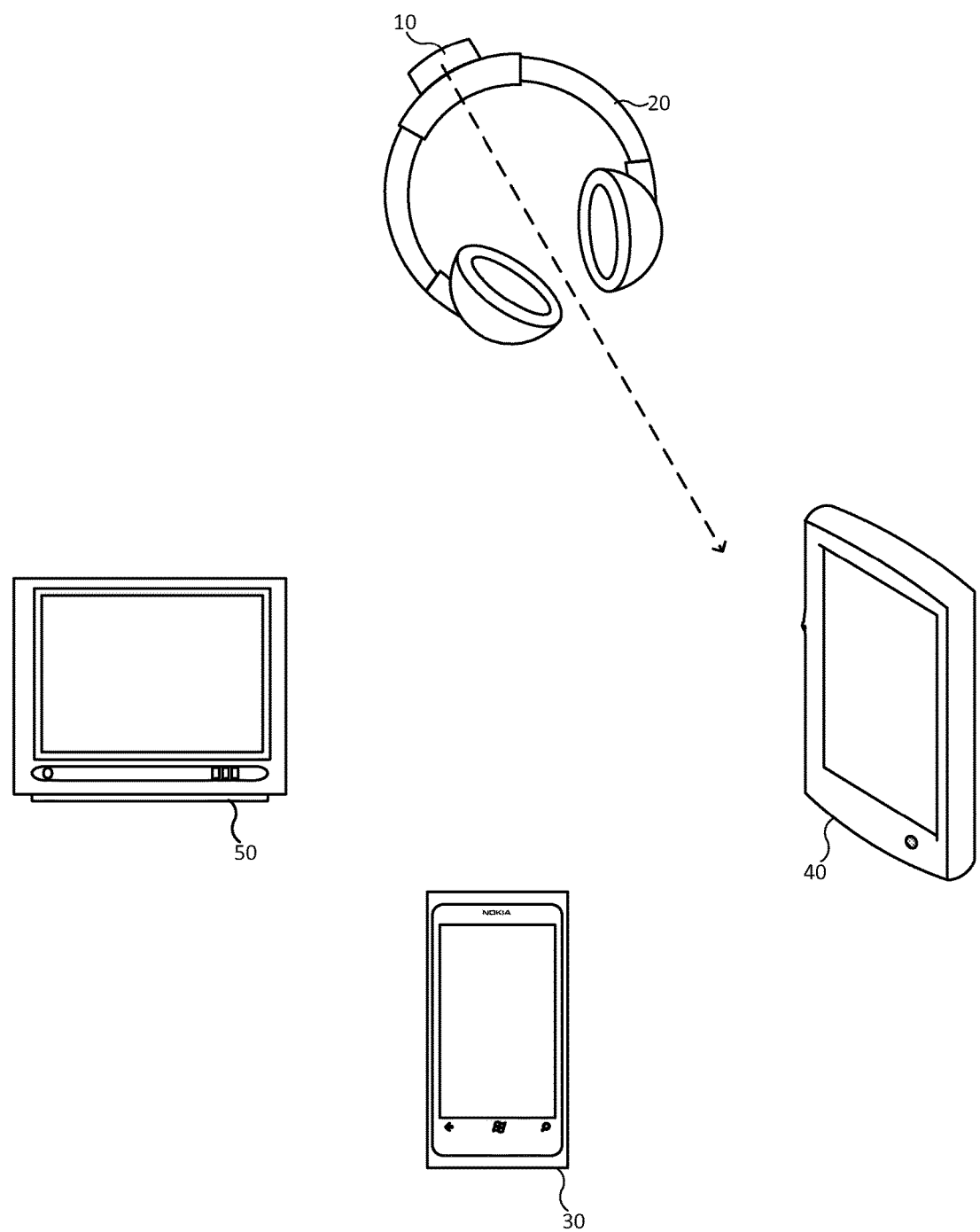

FIGS. 1A to 1C illustrate an example of a system 1 for allowing a user to control remotely one or more electronic devices 30, 40, 50. The system 1 comprises a controlling device 10 and at least one controlled device 30, 40, 50. In the example of FIG. 1, three controlled devices are shown: a mobile telephone 30, a tablet computer 40 and a television 50. It will of course be appreciated, however, that the at least one controlled device 30, 40, 50 may be of any type.

In general, the system 1 is configured to operate by determining, based on radio frequency packets passed wirelessly between the controlled device 30 and the controlling device 10, an orientation of the controlling device 10 with respect to the controlled device 30. Next, it is determined if the orientation satisfies a predetermined criterion. If the orientation is determined to satisfy the predetermined criterion, the system 1 is configured to respond to a subsequent detection of an event in respect of the controlling device 10 by controlling operation of the controlled device 30. More specifically, the system 1 may determine if the orientation of the controlling device 10 is substantially towards the controlled device 30. At least one of the controlled and controlling devices includes an array of plural antennas (not shown in FIG. 1) for wirelessly transmitting or receiving the at least one radio frequency packet. The way in which the plural antennas may be used to determine the orientation of the controlling device 10 is described below with reference to FIGS. 2A and 2B and FIGS. 3A to 3C.

In the example of FIGS. 1A to 1C, the controlling device 10 is affixed to a user-wearable carrier 20. In this example, the user-wearable carrier 20 is itself an electronic device, specifically an audio headset. The controlling device 10 and the controlled device 30 may be configured such that, when the controlling device 10 is affixed to the carrier 20 in a particular manner and the carrier 20 is worn by the user in a particular manner, the predetermined criterion is satisfied when the user is facing the controlled device 30. In this way, the user is able to control the operation of a one of the controlled devices 30, 40, 50 simply by turning their head towards the controlled device 30 and then causing the detectable event in respect of the controlling device 10 to occur. The detectable event may be caused to occur, for example, by the user moving their head (and thereby also the controlling device 10) in a predetermined manner. For example, the user may be able to control the controlled device 10 by facing the controlled device 30 and subsequently nodding their head (i.e. moving their head backwards and forwards) or shaking their head (i.e. moving their head backwards and forwards). Alternatively, or additionally, the detectable event may correspond to the user facing the controlled device 30 for longer than a predetermined duration. Put another way, the detectable event may correspond to the predetermined criterion with respect to the orientation of the controlling device being satisfied for longer than a predetermined duration.

It will thus be appreciated that examples of the invention provide a simple and user-friendly way for a user to control one or more electronic devices. This may particularly useful when a user has a number of different electronic devices within their local environment, such as their home.

Let us now consider, for illustrative purposes only, a particular implementation of the system 1 with respect to FIG. 1A to 1C. In FIG. 1A, the user is facing the television 50, which is streaming audio, for example via Bluetooth or Wi-Fi, to the audio headset 20. While watching the television 50, the user receives notification of an incoming voice communication via their mobile telephone 30.

In order to answer the incoming voice communication, the user turns to face their mobile telephone 30 and nods their head. The change in orientation of the controlling device 10 can be seen in FIG. 1B. The controlled device 30, which is in this example the mobile telephone, responds to the determination that the orientation of the controlling device 10 with respect to itself satisfies the predetermined criterion and a subsequent detection that the user has nodded their head by causing the incoming voice communication to be answered. It will be appreciated that in this specific example, the event in respect of the controlling device 10 is caused by the user shaking their head.

The mobile phone 30 may additionally cause the received voice data to be transmitted to the audio headset for provision to the user. In such examples, the television 50 may respond to the change in the orientation of the controlling device 10 such that it is no longer facing the television by ceasing transmission of the audio data to the headset 20. In addition, the program or service being provided by the television 50 may be paused or stopped in response to detection that the user has turned away from the television 50. Alternatively, prior to turning to face the mobile phone 30, the user may provide a command to the television 50, for example, by shaking their head, to cause transmission of the audio data from the television 50 to be interrupted and optionally, the service or program to be paused or stopped. In yet other examples, the audio headset 20 may be configured such that the wireless connection with the mobile telephone 30 takes priority over the wireless connection with the television 50. As such, when a connection for transmitting audio data from the mobile telephone 30 is initiated the connection with the television 50 may be dropped.

While the voice call via the mobile telephone 30 is ongoing, the user may receive another voice communication request (e.g. a VOIP communication request) via their tablet computer 40. In order to answer the voice communication request, the user turns to face their tablet computer (as can be seen in FIG. 1C) and performs the necessary recognisable (or distinct) gesture. In response to detecting that the controlling device 10 is oriented in the predetermined manner with respect to the tablet computer 40 and that the gesture has been performed, the tablet computer 40 causes the communication request to be answered. In addition, voice data may be streamed to the audio headset 20, in place of voice data from the mobile telephone 30.

It will of course be appreciated that the above is merely an example and that various different electronic devices may be controlled in a great variety of different ways. Examples of other electronic devices which may be controlled using a controlling device 10 according to the invention include, but are not limited to, dedicated audio players, desktop or laptop computers, home security systems, such as a video entry system and home control panels, for example, for controlling lights, air conditioning, curtains etc.

Examples of the way in which the above-described functionality may be achieved will now be discussed with reference to FIGS. 2A and 2B and FIGS. 3A to 3B.

Figure 2A:
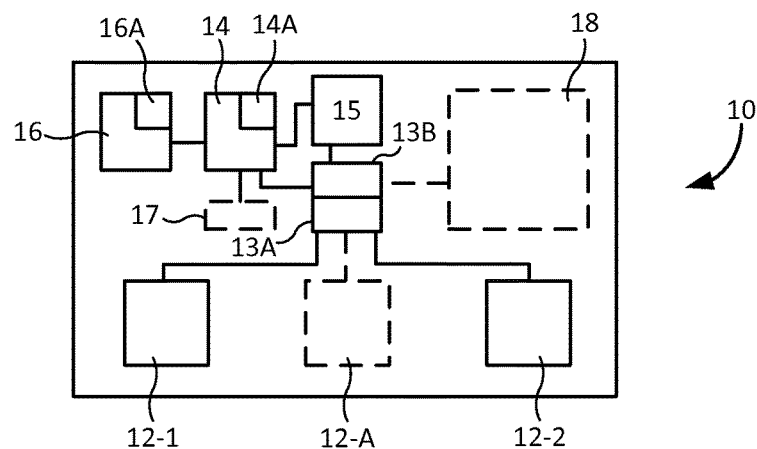
FIGS. 2A and 2B are schematic illustrations of a controlling device and a controlled device respectively.
Figure 3A:
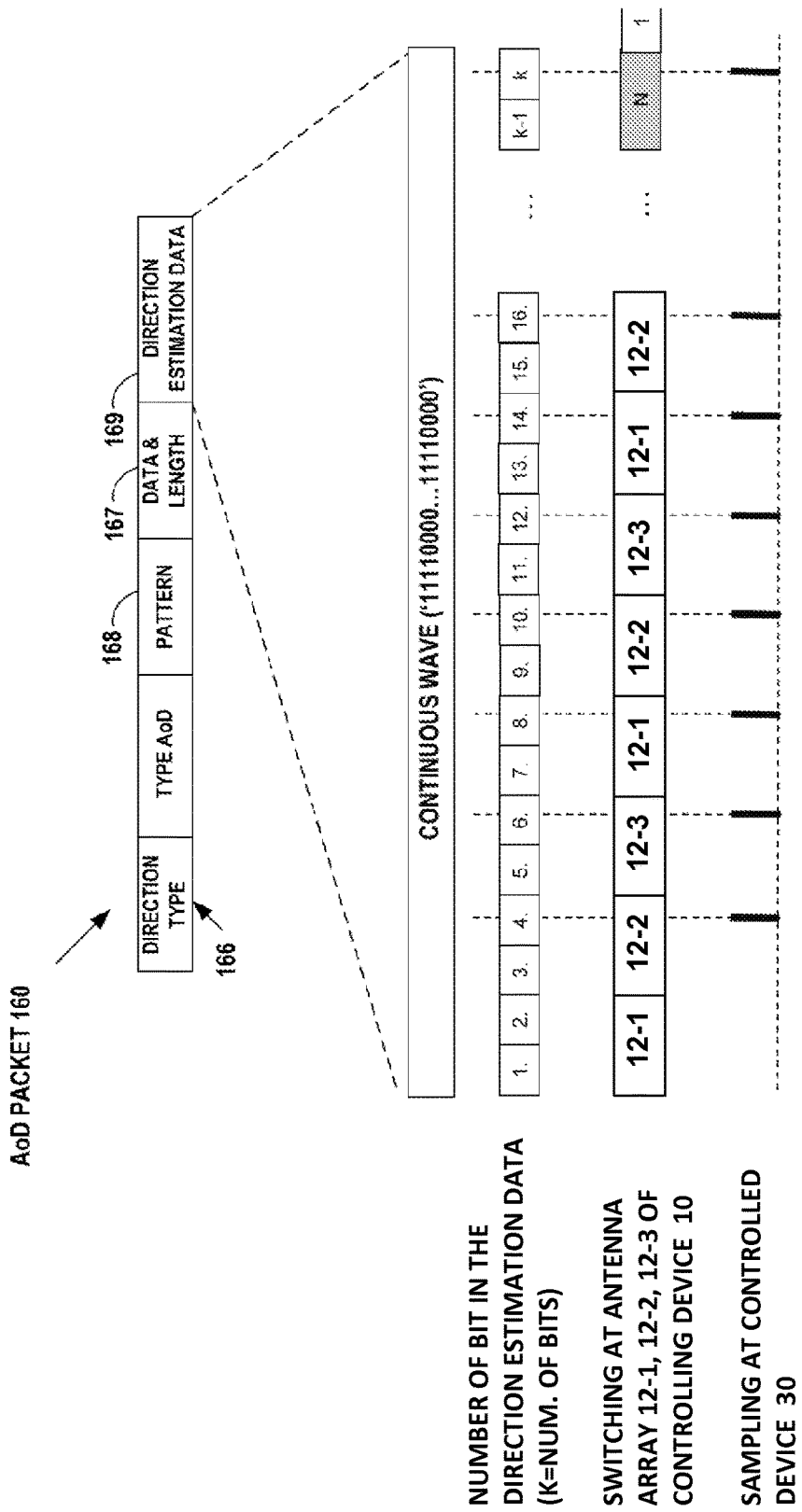
FIGS. 3A to 3C illustrate an example of determination of an orientation of a controlling device with respect to a controlled device.

FIG. 2A is a schematic illustration of the controlling device 10 in accordance with examples of embodiments of the invention. The controlling device 10 comprises plural antennas 12-1-12-n (also referred to as an antenna array 12) which are configured to transmit radio frequency packets. The controlling device 10 also comprises a commutating RF switch 13A and a multiplexer 13B which connect a transmitter unit 15 to the antenna array 12. The transmitter unit 15 may be part of a transceiver unit. The multiplexer 13B is configured to pass an RF signal bearing a positioning packet 160 (such as shown in FIG. 3A) from the transducer 15 to the switch 13A. The switch 13A is configured to sequentially activate each of the plurality of antennas 12-1-12-n of the array to transmit portions of a radio frequency packet 160. In this example, the packet 160 is configured such that the direction of departure of the packet from the antenna array 12 can be determined. The packet 160 (hereafter referred to as a positioning packet) is discussed in more detail below.

The transmitter 15, the multiplexer 13B and the switch 13A are operable under the control of a controller 14. The controller 14 comprises at least one processor 14A which is operable under the control of computer readable instructions 16A stored on at least one memory 16. The controller 14 may also comprise one or more application specific integrated circuits (not shown). The at least one processor 14A may be any suitable type, or combination of types of processor and/or microprocessor. The at least one memory 16 may comprise any suitable type, or combination of suitable types, of volatile and/or non-volatile memory media, such as ROM, RAM and flash memory 16.

The transmitter 15 may be configured to operate using any suitable type of wireless transmission/reception technology. Suitable types of technology include, but are not limited to, Bluetooth and Bluetooth Low Energy (BTLE). Other types of suitable technology include WLAN, and Zigbee. Use of BTLE may be particularly beneficial due to its relatively low energy consumption and because most mobile phones and other portable electronic devices will be capable of communication using BTLE technology.

The controlling device 10 may also comprise a power source 17, such as a coin cell battery, for providing power to other components of the device 10. In some examples, power for the controlling device 10 may be drawn from the power supply of the carrier 20.

In some examples, which will be discussed in more detail later, the controlling device 10 may comprise an event detection unit 18. The event detection unit 18 may be of any suitable type for detecting the occurrence of an event in respect of the controlling device 10. For example, where the event comprises movement of the head, the event detection unit 18 may comprise an accelerometer for detecting the movement. In examples in which the event comprises a user input, the event detection unit may comprise any suitable type of user input interface, such as but not limited to a physical key or button, a touch sensitive element, or an optical sensor. Signals indicative of the detected event may be passed to the controller 10, which may cause similarly indicative signals to be transmitted via the transmitter 15 and one or more of the antennas 12 to the controlled device 30.

Figure 2B:
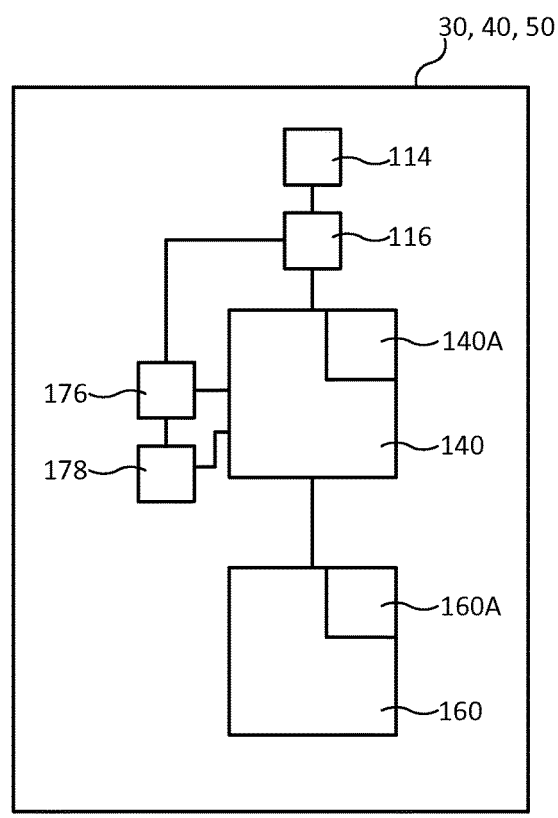

FIG. 2B is a simplified schematic illustration of a controlled device 30 according to example embodiments. It will of course be appreciated that the controlled device 30 may comprise various different components, which are not shown FIG. 2B, and that the nature of these components is dependent on the type of the controlled device. For example, where the controlled device 30, 40, 50 is of a type depicted in FIGS. 1A to 1C, the device 30 may include a display and a user interface, neither of which are shown in FIG. 2B.

The controlled device 30 comprises an RF antenna 114 which is configured to receive positioning packets from controlling device 10. The controlled device 30 also comprises a receiver unit 116 for receiving RF signals from the antenna 114. The receiver unit 116 may be part of a transceiver unit. These signals are then passed to a sampler and phase detector 176 which is configured to perform phase detections in respect of the portions of the positioning packet 160 received from each of the antennas in the array 12 of the controlling device 10. The sampler and phase detector 176 is also configured to determine the offsets between the phases of the portions of the positioning packet. Data related to the characteristics of the antennas 12-1-12-n, the commutating frequency of switch 13A, and other factors, may be included in the positioning packet 160. These may be used by the sampler and phase detector 176 together with a decoder 178 to determine the orientation of controlling device 10 with respect to the controlled device 30.

The controlled device 30 further includes a controller 140 which is configured, under the control of computer-readable instructions 160A stored on at least one memory 160, to control the other components of the controlled device 30. The controller 140 comprises at least one processor 140A which is operable to execute the computer readable instructions 160A stored on the memory 160. The controller 140 may also comprise one or more application specific integrated circuits (not shown). The at least one processor 140A may be any suitable type, or combination of types of processor and/or microprocessor. The at least one memory 160 may comprise any suitable type, or combination of suitable types, of volatile and/or non-volatile memory media, such as ROM, RAM and flash memory 160.

The computer-readable instructions 160A stored in the memory 160 of the controlled device 30 which cause the device to operate on accordance with embodiments of the invention may be in the form of a software application, which may be pre-loaded or downloaded on to the device.

The controller 140 is configured to receive from the decoder 178 data indicative of the orientation of the controlling device 10 with respect to the controlled device 30. The controller 140 is configured to determine when the orientation satisfies a predetermined criterion. The predetermined criterion may comprise the orientation of the controlling device 10 being within a particular range of orientations. The range of orientations may be relatively small and may be centred on the orientation which results from the user facing the controlling device 30, during normal use of the controlling device 10.

The controller 140 is configured such that, in response to the determination that the orientation of the controlling device 10 satisfies the predetermined criterion, it becomes responsive to the occurrence of an event in respect of the controlling device 10. Put another way, a determination that the predetermined criterion is satisfied, triggers responsiveness to the occurrence of an event in respect of the controlling device 10.

As mentioned above, the event may comprise the orientation of the controlling device 10 remaining substantially constant for longer that a predetermined duration. As such, the controller may, for example, respond to the determination that the orientation of the controlling device 10 satisfies the predetermined criterion by starting a timer and then periodically re-calculating (or re-checking) the orientation. If each of the orientation calculations carried out before expiry of the timer indicate that the predetermined criterion is satisfied, the controller may register that an event has occurred. In other examples, the controller 140 may not start a timer but may periodically re-calculate the orientation. When a threshold number of calculations for which orientation satisfies the criterion is met, the controller may register that an event has occurred.

Also as mentioned above, the event may comprise the orientation of the controlling device with respect to the controlled device 30 varying with a predetermined pattern, for example because the user shakes or nods their head. As such, following a determination that the predetermined criterion is satisfied, the controller 140 may respond by monitoring the orientation of the controlling device and comparing the variations in orientations to a predetermined pattern(s). If the variations are determined to sufficiently match the pattern, then an event is deemed to have occurred.

In examples in which the controlling device 10 includes an event detection unit 18, in response to determination that the orientation of the device 10 satisfies the predetermined criterion, the controller may become responsive to receipt of signals deriving from the event detection unit 18 which are indicative of an event, for example movement of the user's head or the pressing of a button, to register the occurrence of the event.

In response to the detection of occurrence of the event, the controller 140 may be operable to cause an operation to be performed. The nature of the operation may depend on a number of factors, including the type of the controlled device 30. As discussed above, in one example in which the controlled device 30 is a mobile telephone 30 or a tablet computer 40, the operation may comprise answering or accepting an incoming voice communication request. Additionally or alternatively, the operation may comprise causing audio data to be output by the controlled device 30. In examples in which the controlling device 10 is carried on an audio headset, this may comprise the audio data being wirelessly streamed to the audio headset. In other examples, this may comprise providing the audio data via a loudspeaker which forms part of the controlled device.

The controller 14 may be configured to recognise a plurality of different events and to respond to different events by causing different operations to be performed. For example, in the case of an incoming voice communication, maintaining the orientation of the controlled device for longer than the predetermined duration may cause the call to be answered, whereas a variation in orientation deriving from the user shaking their head may cause the voice communication request to be rejected. In other examples, such as when the controlled device is the television 50, detection of a variation in orientation that is indicative of the user shaking their head may, for example, cause the audio volume or the television channel number to be decreased, whereas the detection of a variation in orientation that is indicative of the user nodding their head may cause the audio volume or the television channel number to be increased.

The controlled device 30 may be configured such that it only begins to scan for positioning packets 160 and to determine the orientation of the controlling device 10 in response to a particular event. For example, where the controlled device 30 is a communication device, the controller 140 may be configured to automatically set the controlled device 30 into scanning mode in response to an incoming call. In this way the battery of the controlled device may be preserved. The provision of this functionality may be dependent on the type of the controlled device. For example, if the device is mains powered (e.g. the television 50), it may be configured constantly to scan for positioning packets, whereas battery powered devices may be configured to scan for positioning packets only in response to occurrence of an event. Additionally or alternatively, the user may be able to activate and deactivate scanning for positioning packets. When the scanning is deactivated, the device 30, 40, 50 may not be controllable using the controlling device 10.

It will of course be appreciated that the schematic illustrations of the devices 10, 30 of FIGS. 2A and 2B are simplified for ease of understanding. As such, the components illustrated may be functional sub-parts of more complex elements included in the device. For example, the transmitter 15 (and optionally at least part of the controller 14 and memory 16) of the controlling device 10 may be part of a transceiver chip, which is not shown in the Figures. Such may also be true of the components of the controlled device 30.

A way in which the orientation of the controlling device 10 may be determined will now be discussed with reference to FIG. 3A to 3C. It will of course be appreciated, however, that other methods may alternatively be employed.

FIG. 3A is a schematic illustration of an example of a positioning packet 160, which may be passed wirelessly between the controlling device 10 and the controlled device 30 in order to determine the orientation of the controlling device 10 with reference to the controlled device 30.

The positioning packet 160 may include an indication (or field) 166 of the type of the positioning packet 160. Put another way, the positioning packet may indicate whether the positioning packet relates to angle-of-arrival (AoA) information (i.e. is an AoA positioning packet) or angle-of-departure (AoD) information (i.e. is an AoD positioning packet). An AoA packet is one that may be received by the antenna array 12, whereas the AoD packet is one that is transmitted by the antenna array. In this example, and that described with reference to FIGS. 2A and 2B, AoD positioning packets are used. However, as will be appreciated and as is discussed below, in some examples, AoA packets may instead be used.

The positioning packet 160 may also include a reference binary bit pattern field 168. This indicates a repeating bit pattern (in this example "111100"), which is transmitted in a direction estimation data field 169 of the packet 160. The positioning packet 160 may include a data and length field 167, that includes data such as coding, length of the direction estimation data field 169, the switching frequency of the switch 31A, properties of the antennas 12-1-12-n, and other factors useful in enabling the receiving device, in this example, the controlled device 30, to determine the orientation of the controlling device 10.

Also illustrated on FIG. 3A is an example of the switching pattern of the RF switch 13A. In this example, when transmitting the direction estimation data 169, the switch switches between antennas every two bits. In FIG. 3A it is assumed that the antenna array 12 includes three antennas. It can therefore be seen that in the example of FIG. 3A, the first antenna 12-1 of the array transmits the first two bits (in this example, "11"), the second antenna 12-2 transmits the second two bits ("11") and the third antenna transmits 12-3 transmits the third pair of bits "00". This is then repeated until all bits of the direction estimation data have been transmitted. It will of course be appreciated that this is only an example and that any other switching patterns may be used. For example, one of the antennas of the array (for example, the middle antenna 12-2 of an array) may be utilised twice as often as the other two antennas 12-2, 12-3 (e.g. the switching pattern may be 12-2, 12-1, 12-2, 12-3, 12-2, 12-1, 12-2, 12-3 and so on).

Figure 3B:
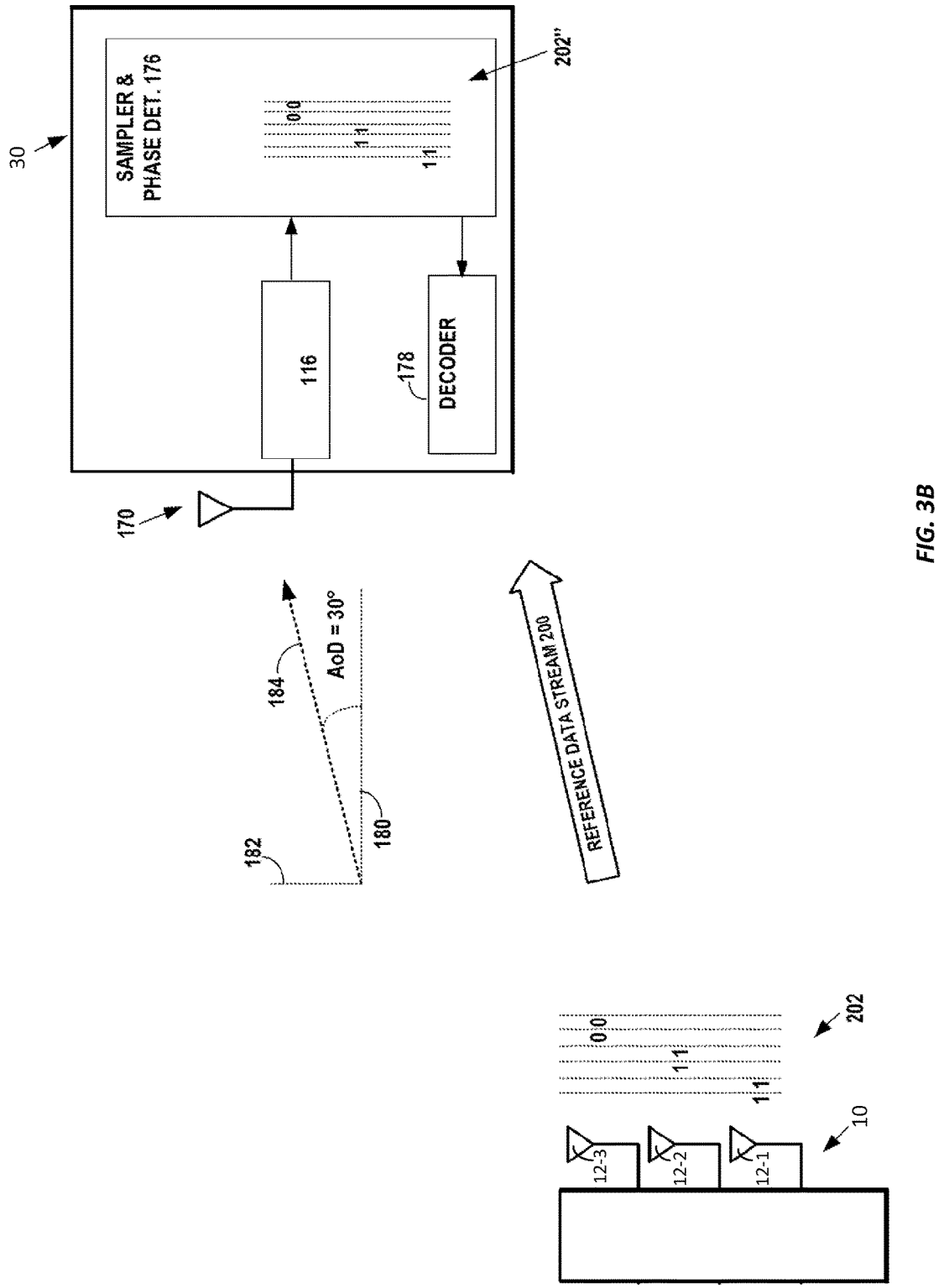
Figure 3C:
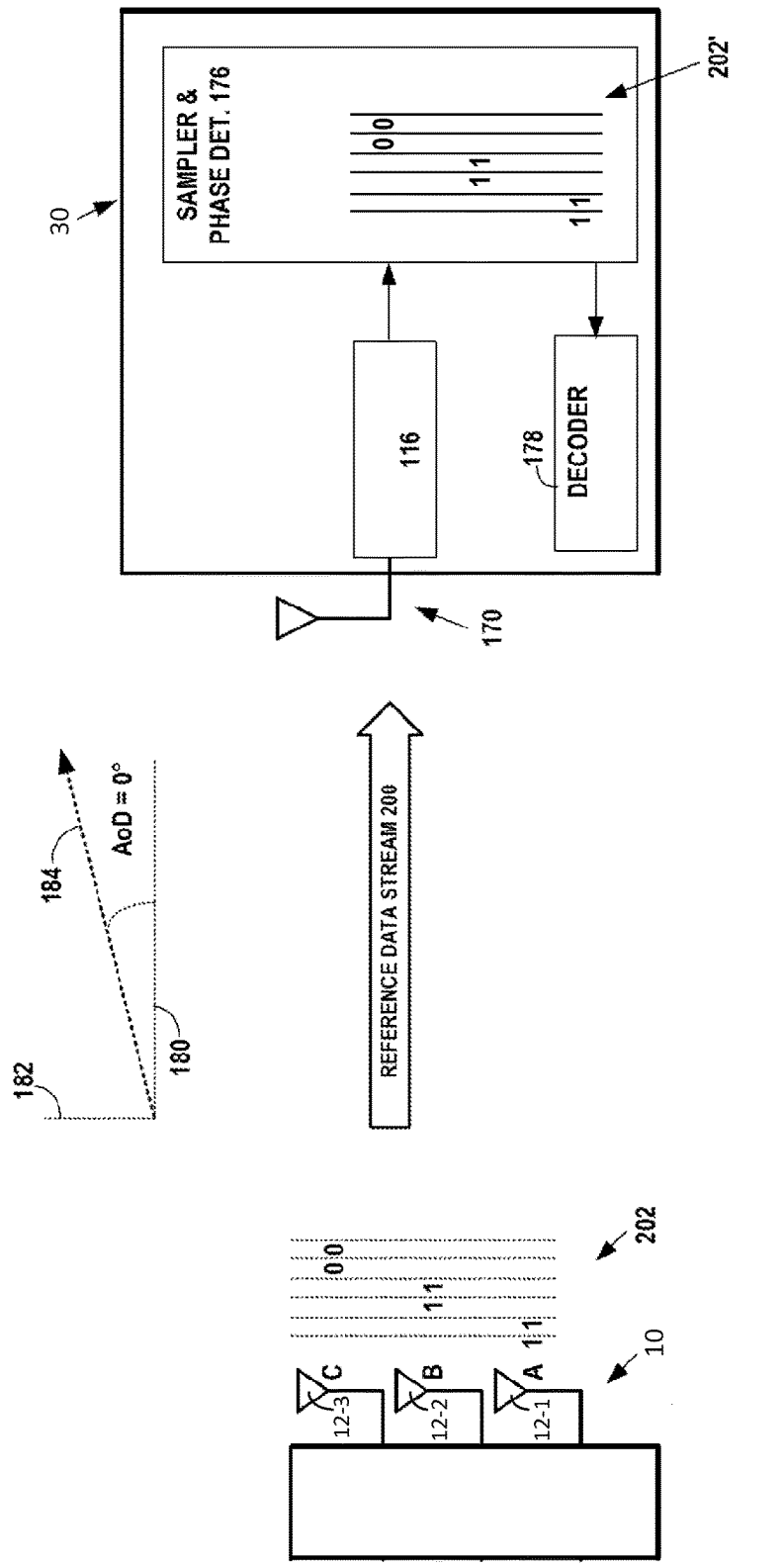

FIGS. 3B and 3C are schematic illustrations of the transmission of the packet 160 of FIG. 3A by the antenna array 12 and its reception by the controlled device 30, when the controlling device 10 is at different orientations with respect to the controlled device 30.

Transmission of the packet 160, which is generated by the controller 14 under the control of the computer-readable instructions 15A is caused by the multiplexer 13B (not shown in FIGS. 3B and 3C) passing the direction estimation data to the commutating RF switch 13A (also not shown) that connects the transmitter 15 to the array of antennas 12-1, 12-2, 12-3. The switch 13A sequentially activates each of the three antennas 12-1, 12-2, 12-3 at a commutating frequency to sequentially transmit 2-bit portions of the direction estimation data in a reference data stream 200. The multiplexer and the switch are configured such that each 2-bit portion is transmitted in a consecutive phase incremented by an interval (sometimes called a delay interval). Put another way, the direction estimation data in the positioning packet 160, is transmitted by antenna array 12 in sequential phases. The increments in phase are illustrated by the dotted lines representing the transmitted and received data streams 202, 202'. In the Figures of 3A to 3C, the estimation data has the repeated reference pattern of bits "111100". In this example, the first antenna 12-1 transmits the first two bits "11", the second antenna 12-2 transmits the second two bits "11" and the third antenna 12-3 transmits the third two bits "00". The RF transmission emanating from each of the antennas 12-1, 12-2, 12-3 may be an isotropic electromagnetic wave.

It will of course be appreciated that the 2-bit portions of the direction estimation data in the data stream 200 are only one example and that the portions are not limited to bit intervals but may be arbitrary, also including any fraction of a bit interval or any number of bits in such portions may range from one to many.

In the schematic illustration of FIGS. 3B and 3C, the antennas 12-1, 12-2, 12-3 of the antenna array 12 are in a linear array, with the second antenna being provided between the first and third antennas 12-1, 12-3. A linear array may be referred to as a one-dimensional array. Use of a linear array may allow the orientation of the controlling device to be determined in two dimensions (i.e. in the plane in which the liner array lines). However, in other examples a two dimensional array may be used. The two dimensional array, which requires at least three antennas, may allow the orientation to be determined in three dimensions. In yet other examples, the antenna array 12 may be arranged three dimensions.

In the example of FIGS. 3B and 3C, the three antennas 12-1, 12-2, 12-3 are arranged along a linear axis 182 within the controlling device 10. A normal 180 to the linear axis is shown perpendicular to the linear axis 182. The two axes 180 and 182 define a plane within which the angle of departure (AoD) of the vector 184 lies, which will be the apparent direction of transmission of the reference data stream 200 from the controlling device 10, as viewed from the controlled device 30. In this specific example, an angle of departure of 0 degrees corresponds with the orientation of the controlling device 10 being directly towards the controlled device 30. However, depending on the arrangement of the antennas in the controlling device 10 (and optionally also the orientation of the controlling device 10 with respect the carrier 20), this may not always be the case and a different angle may correspond to the controlling device 10 directly facing the controlled device 30.

In FIG. 3B, the controlling device 10 is at an angle of 30 degrees to the controlled device. This causes a phase shift in the signals received from each of the first and third antennas 12-1, 12-3 when compared to the portion of the signal received from the second antenna 12-3, which is located between the first and third antennas 12-1, 12-3 in the linear array 12. This is because the portion of the packet received from the first antenna 12-1 has further to travel, compared to the portion received from the second antenna 12-2. As such, the phase of the portion received from the first antenna is shifted towards the portion received from the second antenna 12-2. Conversely, the portion of the packet 160 received from the third antenna 12-3 has to travel a shorter distance, compared to the portion received from the second antenna 12-2. As such, the phase of the portion of the packet received from the third antenna 12-3 is also shifted towards the portion received from the second antenna. This is illustrated schematically in FIG. 3B, in which the signal 202' received at the controlled device 30 is shown to be compressed compared to the signal 202 transmitted by the controlling device 10.

In FIG. 3C, the orientation of the controlling device 10 is directly towards the controlled device 30. This means that the first and third antennas 12-1, 12-3 are both the same distance away from the antenna 170 of the controlled device. This distance is further than the distance between the second, middle antenna 12-2 and the controlled device 30. Consequently, the portion of the signal received from the first antenna 12-1 is shifted towards that received from the second antenna 12-2, but the portion of the signal received from the third antenna 12-3 is shifted away from that of the second antenna 12-2. This is illustrated schematically in the received signal 202' of FIG. 3C. In this example, as the distances from the two outer antennas are the same, the phase shifts compared to the portion of the signal received from the middle antenna is the same but has an opposite sign. This may, in an equally spaced linear array such as this, be interpreted as an indication that the controlling device 10 is oriented directly toward the controlled device 30.

It will thus be appreciated from FIGS. 3B and 3C that, in some examples, the orientation of the controlling device may be determined by comparing the phase shifts of portions of the signals received from two antennas (in this example, the outer antennas of the array) compared to that received from a third antenna (in this example, the middle antenna). Similarly, variations in the phase shifts may be used to determine movement of the controlling device 10 (for example, resulting from the user shaking their head).

In the example shown in FIGS. 3A to 3C, the array 12 comprises three antennas. However, in some examples, the array 12 may include only two antennas or four or more antennas. In examples including two antennas, the orientation may be determined in a slightly different manner. For example, instead of comparing the phase shifts relative to a portion of the signal transmitted by a reference antenna, the phases of the portions of the signal received from the two antennas may be compared with one another. If the phases of the portions are substantially the same, it may be inferred that the two antennas of the array are equidistant from the controlled device 30 and so the controlling device 10 is oriented substantially directly towards the controlled device 10. If, however, the phases are different (because one of the antennas is further away than the other), then is may be determined that the controlling device is not oriented directly towards the controlled device 30. In other similar examples, the phases of the portions from each antenna may not be compared with one another, but instead the signal as a whole (i.e. including the portions from both antennas) may be considered to ascertain how the phases are shifted and thereby to determine the orientation of the controlling device 10. For example, if there is no phase shift (i.e. the portions from each antenna are equally spaced), it may be determined that orientation is directly towards the controlled device 30. If, however, the portions from each antenna are not equally spaced, it may be determined that the orientation is not towards the controlled device 30. In this case, if the switching pattern of the two antenna is an alternating pattern, the received signal will comprise a repeating pattern of two portions (one from each antenna) with a small interval between them followed by a larger interval to the next two (closely spaced) portions. By considering the two closely spaced portions, it can be determined which antenna is further away from the controlling device and so also which way the user is facing. More specifically, the antenna which transmitted the first arriving portion of the two closely spaced portions may be the further away of the two.

In other examples, instead of measuring the phase shift of the received signal portions, the controlled device may be configured to measure the signal strengths (e.g. the RSSI) of the received portions. If the signal strengths of the portions transmitted from each of the two antennas 12 are different, it can be determined that the two antennas are not equidistant from the controlled device 30. If, however, the signal strengths are the same, it can be determined that the two antennas are equidistant from the controlled device and, as such, that the controlling device 10 is oriented substantially directly toward the controlled device 30. In addition, by monitoring the change in signal strengths received from each antenna, changes in the orientation of the controlling device 10 (for example, resulting from the user shaking their head) can be identified. For example, if the signal strength from a right-hand antenna (from the user's perspective) decreases and the signal strength from a left-hand antenna increases (such that the signal strength from the left antenna is greater than that from the right), it may be determined that the user is looking to the right. If the signal strength from the right hand antenna subsequently becomes greater than that from the left, it may be determined that the user has looked to the left. From this it may be inferred that the user has shaken their head.

Figure 4:
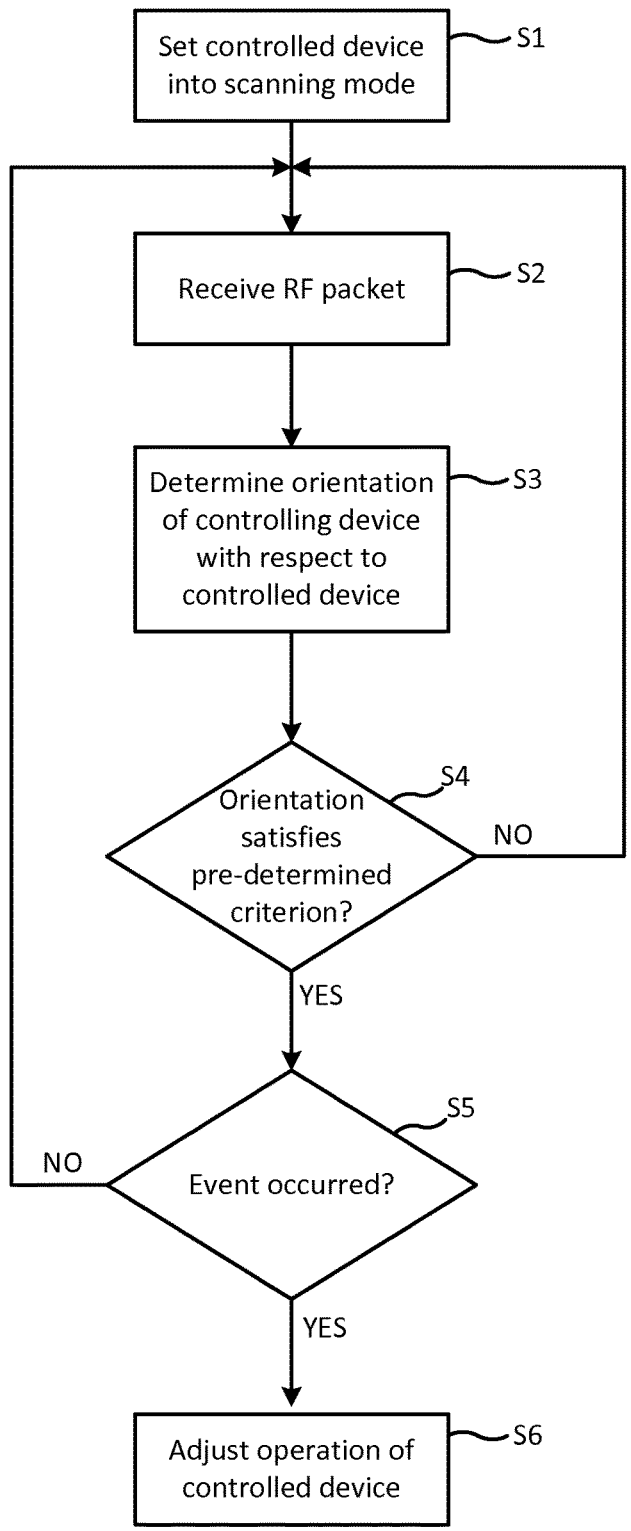
FIG. 4 is a flow chart illustrating an example of a method which may be performed by the controlled device of FIGS. 2A and 2B.

FIG. 4 is a flow chart illustrating a method for controlling an electronic device in accordance with examples of embodiments of the invention.

In step S1, the controlled device 30 is set into a scanning mode in which it scans for received positioning packets. This may be triggered automatically in response to an event occurring in respect of the controlled device 30. One, non-limiting, example of such an event is the arrival of an incoming communication, such as a telephone call. Alternatively, the controlled device 30 may be set into a scanning mode by a user or may be in scanning mode at all times at which the controlled device is powered up or may scan periodically.

In step S2, the controlled device 30 wirelessly receives from the controlling device 10 at least one radio frequency packet 160. As described above, portions of the packet 160 may have been sequentially transmitted from each of plural antennas 12 provided in the controlling device 10.

In step S3, based on the radio frequency packet passed between the controlling and controlled devices 10, 30, the controlling device 30 determines the orientation of the controlling device with respect to itself.

In step S4, the controller 10 of the controlled device 30 determines whether the orientation of the controlling device 10 satisfies a predetermined criterion. The criterion may be, for example, that the controlling device 10 has a particular orientation with respect to the controlled device 30. The particular orientation may be an orientation that corresponds to the user facing the controlled device 30 when wearing the controlling device 10 in a specified manner. The criterion may be, for example, that the controlling device 10 has an orientation that is within a particular range of orientations with respect to the controlled device 30. The range of orientations may include the controlling device 10 being oriented directly towards the controlled device 30. The range of orientations may be centred on the orientation that is directly towards the controlled device 30.

If a negative determination is reached in step S4 (i.e. the orientation does not satisfy the predetermined criterion), the method returns to step S2. If, however, a positive determination is reached, the method proceeds to step S5. In step S5, the controller 10 determines if detection of an event in respect of the controlling device 10 has occurred. As discussed above, the event may comprise the controlling device 10 remaining at the same orientation for longer than a predetermined duration. The event may alternatively comprise the orientation of the controlling device 10 varying with a recognised pattern. For example, the controlled device 30 may, subsequent to the orientation of the controlling device 10 satisfying the predetermined criterion, monitor the phase shifts or signal strengths of signal portions received from different ones of the array of antennas 12. Based on the monitored phase shifts or signal strengths, changes in orientation of the controlling device 10 may be recognised.

If an event in respect of the controlling device 10 is detected, the method proceeds to step S6. If an event is not detected, the method may return to step S2.

In response to detecting the occurrence of the event, in step S6, the controlled device 30 adjusts its current operation or, put another way, performs an operation. The type of the performed operation may be dependent on the type of the event detected. For example, different types of events may be associated with different operations. Similarly, the type of the event may be dependent on the type of the controlled device 30. Some non-limiting examples of operations that may be performed are as follows:

- initiation of the provision of audio data by the controlled device 30;
- termination of the provision of audio data by the controlled device 30;
- acceptance of an incoming communication (e.g. a voice communication) request;
- rejection of an incoming communication request; and
- the initiation or termination of the transmission of data from the controlled device to another device.

Figure 6:
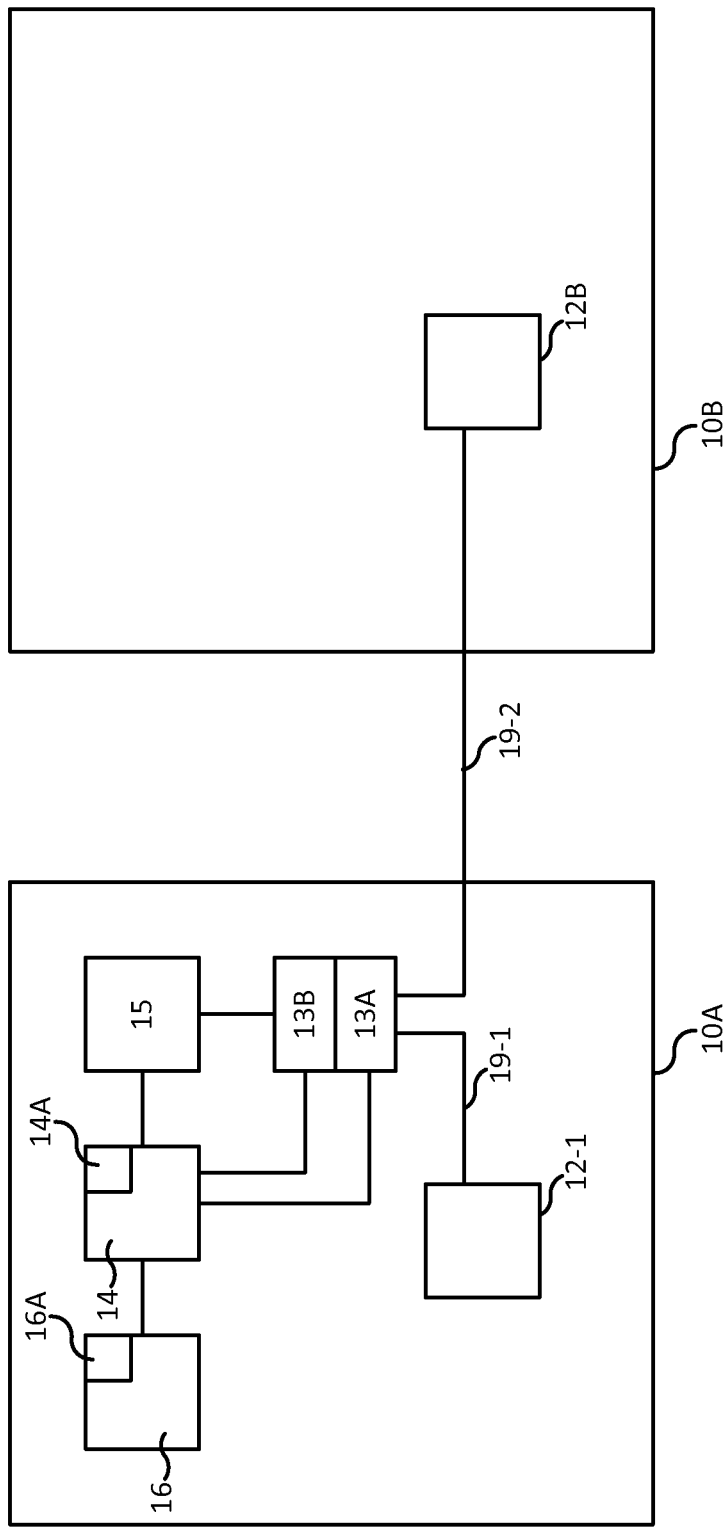
FIG. 6 is a schematic illustration of an example of a variation of the controlling device of FIG. 2A.

It will of course be appreciated that the method of FIG. 6 is an example only. As such, in some examples, certain steps of the flow chart may be omitted and/or additional steps may be included. For example, step S5 may, in some embodiments, be omitted such that the performance of the operation by the controlled device 30 is triggered directly by the orientation satisfying the predetermined criterion and not in response to a subsequent event occurrence being detected. In other examples, in response to determining that the orientation satisfies the predetermined criterion, method may include the step of the controlled device 30 providing an indication, or feedback, of this to the user. This indication may be in any suitable form and may prompt the user to provide a command. The command may be in the form of a recognisable (or distinct) gesture performed in respect of the controlling device 10 (e.g. a nod or shake of their head). The gesture is detected as an event in respect of the controlling device 10 and, in response, the controlled device 30 performs an operation.

In some examples, the operation performed by the controlled device 30 in step S6 may include interacting with another controllable device or causing two other devices to interact. For example, if a user hears their intercom system ring, they may turn to face their intercom/home security system. The system detects this based on the orientation of the controlling device 10 and may then respond to detection of an event (e.g. the user maintaining the orientation for longer than a predetermined duration or nodding or shaking their head) by causing images received, for example, from an external camera to be transmitted to the TV for viewing by the user. The user can then return to facing the TV and may perform a recognised gesture which causes the TV to send a control signal to the security system for opening the user's front door to admit their guest.

FIGS. 5A to 5D illustrate various ways in which the controlling device can be affixed to a user-wearable carrier 20. In this example, the carrier 20 is an audio headset.

Figure 5A:
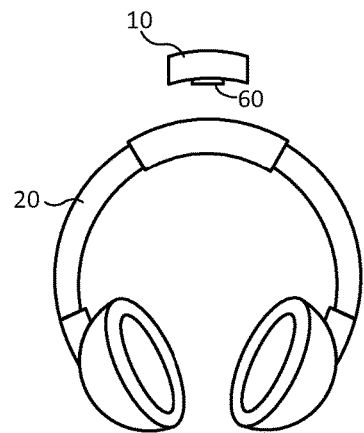
FIGS. 5A to 5D are examples of the integration of the controlling device with a carrier that is wearable by a user.
Figure 5B:
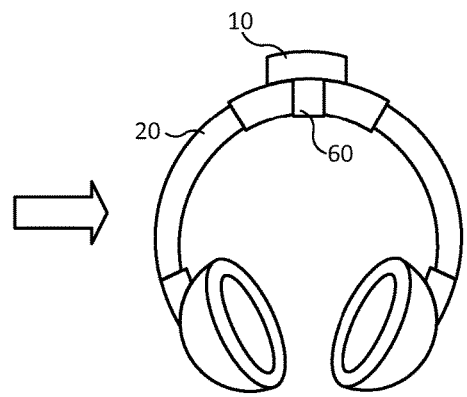

FIGS. 5A and 5B show the controlling device 10 (for example, as described with reference to FIGS. 2A to 3C) in the form of an accessory unit that can be fixed to an audio headset 20, via an attachment mechanism 60 configured to attach the controlling device 10 to carrier 20. In this way, a pre-existing carrier can be used. The attachment mechanism 60 may be of any suitable type. In the example of FIGS. 5A and 5B, the attachment mechanism 60 is in the form of a strap which affixes to the head band of the headset 20. However, in other examples it may be in the form of, for example, a clip, hook and loop fastener, or a snap fastener. In the case of two-part attachment mechanisms, a first part may be affixed to the controlling device and a second part may be affixed, or affixable by the user, to the carrier 20. The attachment mechanism 60 may be configured such that the controlling device 10 can only be affixed to the carrier 10 with one predetermined orientation. In examples in which the controlling device 10 is affixable to the carrier by the user, the controlling device 10 may include its own power supply, such as but not limited to a coin cell battery.

Figure 5C:
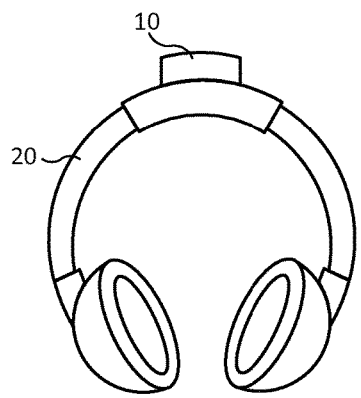

FIG. 5C illustrates the headset 20 having an integrated controlling device 10, in this example permanently affixed to the headband of the audio headset 20. In examples such as that of FIG. 5C, the controlling device 10 may use the same power supply as the headset or may include its own dedicated power supply.

Figure 5D:

FIG. 5D illustrates a headset in which the controlling device 10A, 10B is integrated into both of the earpieces of the audio headset 20. In some examples, each part of the controlling device 10A, 10B (i.e. the parts in each ear piece) may be substantially as described with reference to FIGS. 2A to 3C. In such examples, the controlled device may be configured to compare phases/signal strengths etc received from each part of the controlling device when determining the orientation of the controlling device 10. This may improve the accuracy of the system. In other examples, the components of the controlling device 10 described with reference to FIGS. 2A to 3C may be split between the two parts 10A, 10B. An example of this is shown in FIG. 6, in which the antennas 12-1, 12-2 of the array are split between the two parts 10A, 10B of the device. The first and second antennas 12-1, 12-2 are connected to the switch 13A by first and second connection wires 19-1, 19-2 respectively. One of the connection wires 19-1 may be located entirely within one of the parts of the controlling device 10A. The other 19-2, however, may pass from the one part 10A of the controlling device 10 to the antenna 12-2 in the other part 10B of the controlling device 10B. This connecting wire 19-2 may extend through the headband of the audio headset. The two connection wires 19-1, 19-2 may be the substantially the same physical length to ensure that the signal must travel the same distance from the switch 13A to each antenna 12-1, 12-2. This may ensure the accuracy of the system.

In examples, such as those of FIGS. 5B and 5C, in which the controlling device 10 is integrated with the audio headset 20, audio data may be wirelessly received at the headset 20 from the controlled device 30 using at least one of the antennas of the antenna array 12. In such examples, the antenna(s) may be connected to the speakers of the earpieces. In examples in which the control device 10 comprises two parts 10A, 10B (such as that of FIG. 5D), one in each earpiece, the audio data may be received wirelessly from the controlled device 30 by only one of the parts and may be sent to the other earpiece by a wire, for example, routed through the headband.

In some examples, the controlling device 10 may be affixed to the user-wearable carrier 20 such that a normal of a plane in which all the antennas are provided is substantially parallel to the line of sight of the user. In examples in which the carrier is an audio headset, this may be achieved by providing each of the antennas in a single plane that is substantially parallel to an axis connecting the two ear pieces of the headset.

In other examples, each part 10A, 10B of the controlling device may comprise a single antenna, one in each ear piece and may further comprise a transmitter in each earpiece. The transmitters may not be connected with one another and no switch may be required. Instead, the transmitter and antenna in each earpiece transmit independently of one another, optionally with some random jitter applied so as to avoid recurring collisions between the packets transmitted from each earpiece. In this example, the controlled device 10 may determine the orientation of the device (and also any gestures made by the user) by comparing the signal strengths (e.g. RSSI) of the packets from each earpiece. In a variation of this configuration, instead of integrating the parts 10A, 10B of the controlling device 10 into the earpieces, they may simply comprise individual "tags" affixed to the exteriors of the earpieces, for example using a two part fastener.

Each of the configurations described with reference to FIGS. 5A to 5D may have different benefits. For example, some configurations (e.g. the tags affixed to the exterior of the headset) may be cheaper to manufacture than others, some configurations may be backwards compatible with existing carrier devices and others may provide improved accuracy of orientation determination (e.g. the configuration with multiple antennas in each earpiece).

In the above examples, the controlling device 10 is generally described as transmitting a so-called Angle of Departure (AoD) positioning packet for reception by the controlled device 30. However, in alternative examples, so-called Angle of Arrival (AoA) positioning packets may instead be transmitted by the controlled device 30 to the controlling device 10. AoA packets allow the direction of arrival of the positioning packet at the antenna array to be determined. In such examples, the commutating RF switch 13A causes portions of the position packets sequentially to be received by the antennas 12-1-12-$n$. The orientation of the controlling device 10 with respect to the controlled device 30 can be determined by examining the phase and data of the portions of the signals received by each of the antennas 12-1-12-$n$. Typically the device that receives the positioning packet is configured to determine the orientation of the controlling device 10 with respect to the controlled device 30. As such, in examples in which the controlling device 10 determines the orientation, an indication of the orientation may be transmitted back to the controlled device 30. In order to avoid this additional transmission, it may be beneficial for the controlled device 30 to perform the orientation determination and so, also, to receive the positioning packet from the controlling device 10.

In the examples of FIGS. 2A to 2B and 3A to 3C, the controlling device 10 is shown to include the antenna array 12. However, in some examples, the controlled device 30 may instead be configured to include the antenna array 12, the RF switch 13A and the multiplexer 13B. However, so as to facilitate use of embodiments of the invention with existing electronic devices it may be beneficial for the antenna array and switch to be included in the controlling device 10. In this way, in order to utilise example of the invention with an existing device, it may be necessary only to install a new application which allows the existing device to determine the orientation of the controlling device 10 and to respond accordingly.

Although the controlling device 10 has generally been described as being affixed to an audio headset, it will be appreciated that in some examples, it may be affixed to other types of wearable carrier such as, but not limited to a hat, a bracelet, a watch, a glove, or shoulder pads (shoulder pads may be particularly suited to the "two-tag" implementation with one tag, each comprising a transmitter/transceiver and an antenna, being affixed to each shoulder pad and the orientation being determined based on signal strength, e.g. RSSI, received from each tag). By affixing the controlling device to a wearable carrier, the user is able to control the controlled device in a natural manner by directing a body part on which the carrier is worn toward the device they wish to control. Certain commands can then be given to the controlled device 30 by making particular recognised gestures with that body part. In yet other examples the controlling device 10 may not be wearable but may simply be a handheld device.

Although the controlling device 10 can be used with carriers other than an audio headset, the utilisation of the controlling device 10 with an audio headset may be particularly useful. This is because many of the electronic devices in a user's home can produce an audio output and the invention allows the user to select the device to which they are listening simply by turning to face the device, and also optionally performing an action. This facilitates the user in switching between various devices.

It should be realized that the foregoing embodiments should not be construed as limiting. Other variations and modifications will be apparent to persons skilled in the art upon reading the present application. Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method comprising:
    transmitting, by a controlling device, at least one radio frequency wireless positioning packet to a first controlled device and to a second controlled device, using an array of plural antennas forming part of at least one of the controlling device, the first controlled device, and the second controlled device;
    selecting, by the controlling device, either a first orientation of the controlling device facing in a direction of the first controlled device or a second orientation of the controlling device facing in a direction of the second controlled device, the selected first or second orientation serving to respectively select either the first or second controlled device as a selected controlled device;
    transmitting, by the controlling device, at least one radio frequency wireless second packet to the selected controlled device, the at least one radio frequency wireless second packet characterizing a performance of one of a plurality of different predetermined gestures by a user of the controlling device, each of the plurality of different predetermined gestures corresponding to a different operation of the selected controlled device; and
    controlling, by the controlling device, operation of the selected controlled device, in response to detection by the selected controlled device of an event in respect of the controlling device, wherein the event comprises a recognition, based on the at least one radio frequency wireless second packet, of a performance of one of the plurality of different predetermined gestures by the user in respect of the controlling device, each of the plurality of different predetermined gestures corresponding to a different operation of the selected controlled device.

2. The method of claim 1, wherein the event further comprises a determination that the controlling device is facing in a direction of the selected controlled device for longer than a threshold duration.

3. The method claim 1, wherein the performance of the one of the plurality of different predetermined gestures is recognised based on detected variations in the orientation of the controlling device with respect to the selected controlled device.

4. The method of claim 1, wherein controlling operation of the selected controlled device comprises causing the selected controlled device to initiate or terminate provision of audio data.

5. The method of claim 4, wherein the controlling device is affixed to, or is part of, an audio headset, wherein the one of the plurality of different predetermined gestures by the user is a head movement and wherein provision of the audio data is to the audio headset.

6. The method of claim 1 comprising, prior to determining the orientation of the controlling device, automatically setting the selected controlled device into a mode for wirelessly receiving radio frequency packets.

7. The method claim 6, comprising automatically setting the selected controlled device into the mode for wirelessly receiving packets in response to receipt of a communication by the selected controlled device from a third device.

8. The method of claim 1, wherein the orientation is determined in part by sequentially activating each of the plural antennas of the array.

9. The method of claim 1, wherein the controlling device is configured to be affixed to, or is part of, a user-wearable carrier.

10. At least one non-transitory computer-readable memory medium having computer-readable code stored thereon, the computer-readable code being configured to, when executed by a processor, cause an apparatus to:
    transmit, by a controlling device, at least one radio frequency wireless positioning packet to a first controlled device and to a second controlled device, using an array of plural antennas forming part of at least one of the controlling device, the first controlled device, and the second controlled device;
    select, by the controlling device, either a first orientation of the controlling device facing in a direction of the first controlled device or a second orientation of the controlling device facing in a direction of the second controlled device, the selected first or second orientation serving to respectively select either the first or second controlled device as a selected controlled device;
    transmit, by the controlling device, at least one radio frequency wireless second packet to the selected controlled device, the at least one radio frequency wireless second packet characterizing a performance of one of a plurality of different predetermined gestures by a user of the controlling device, each of the plurality of different predetermined gestures corresponding to a different operation of the selected controlled device; and
    control, by the controlling device, operation of the selected controlled device in response to an event comprising recognition by the selected controlled device of a performance of one of the plurality of different predetermined gestures by the user in respect of the controlling device, each of the plurality of different predetermined gestures corresponding to a different operation of the selected controlled device.

11. The at least one non-transitory computer-readable memory medium of claim 10, wherein the event further comprises a determination that the controlling device is facing in a direction of the selected controlled device for longer than a threshold duration.

12. The at least one non-transitory computer-readable memory medium of claim 10, wherein controlling operation of the selected controlled device comprises causing the selected controlled device to initiate or terminate provision of audio data.

13. The at least one non-transitory computer-readable memory medium of claim 10, wherein the controlling device is affixed to or is part, of an audio headset and wherein the one of the plurality of different predetermined gestures by the user is a head movement.

14. The at least one non-transitory computer-readable memory medium of claim 10, wherein the computer-readable code is further configured to, when executed by a processor, cause the selected controlled device to automatically set, prior to determining the orientation of the controlling device, the selected controlled device into a mode for wirelessly receiving radio frequency packets.

15. The method of claim 1, wherein the at least one radio frequency packet is a positioning packet comprising at least one of an angle-of-arrival information or angle-of-departure information.

16. The method of claim 1, wherein the controlling device includes a plurality of antennas, each for transmitting at least one radio frequency packet, and wherein at least one of a determination of the orientation of the controlling device with respect to the selected controlled device or a recognition of the performance of the one of the plurality of different predetermined gestures by the user is performed by comparing signal strengths of packets received from each of the plurality of antennas of the controlling device.

17. An apparatus, comprising:
  at least one processor and at least one memory, the at least one memory including computer-readable code which, when executed by the at least one processor, causes the apparatus to:
  transmit at least one radio frequency wireless positioning packet to a first controlled device and to a second controlled device, using an array of plural antennas forming part of at least one of the apparatus, the first controlled device, and the second controlled device;
  select either a first orientation of the apparatus facing in a direction of the first controlled device or a second orientation of the apparatus facing in a direction of the second controlled device, the selected first or second orientation serving to respectively select either the first or second controlled device as a selected controlled device;
  transmit at least one radio frequency wireless second packet to the selected controlled device, the at least one radio frequency wireless second packet characterizing a performance of one of a plurality of different predetermined gestures by a user of the apparatus, each of the plurality of different predetermined gestures corresponding to a different operation of the selected controlled device; and
  control operation of the selected controlled device in response to an event comprising recognition of a performance of one of the plurality of different predetermined gestures by the user in respect of the apparatus, each of the plurality of different predetermined gestures corresponding to a different control operation of the selected controlled device.

18. The apparatus of claim 17, wherein the event further comprises a determination that the apparatus is facing in a direction of the selected controlled device for longer than a threshold duration.

19. The apparatus of claim 17, wherein performance of the control operation of the remote device comprises causing the remote device to initiate or terminate provision of audio data.

20. The apparatus of claim 17, wherein the apparatus is affixed to or is part of an audio headset or comprises an audio headset and wherein the one of the plurality of different predetermined gestures by the user is a head movement.

21. The apparatus of claim 17, wherein the computer-readable code, when executed by the at least one processor, causes the selected controlled device to automatically set, prior to determining the orientation of the apparatus, the selected controlled device into a mode for wirelessly receiving radio frequency packets.

22. The apparatus of claim 17, wherein the computer-readable code, when executed by the at least one processor, causes the selected controlled device to determine the orientation of the apparatus by sequential activation of each of the plural antennas of the array.

* * * * *